Figure 1:
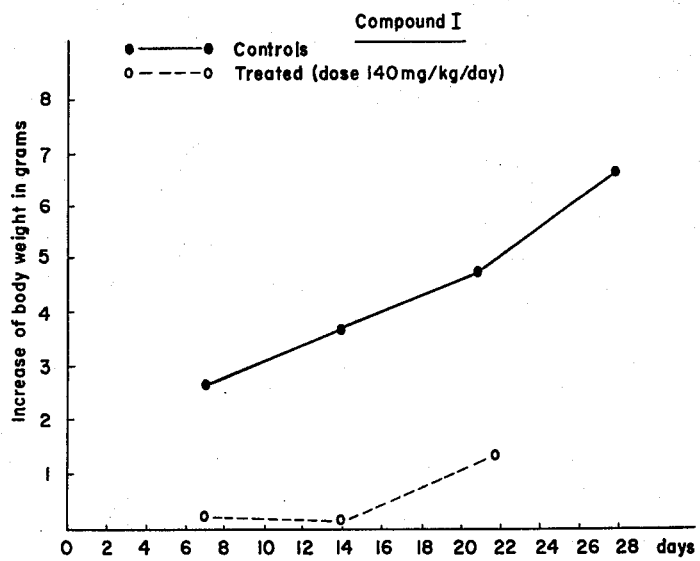
Figure 2:
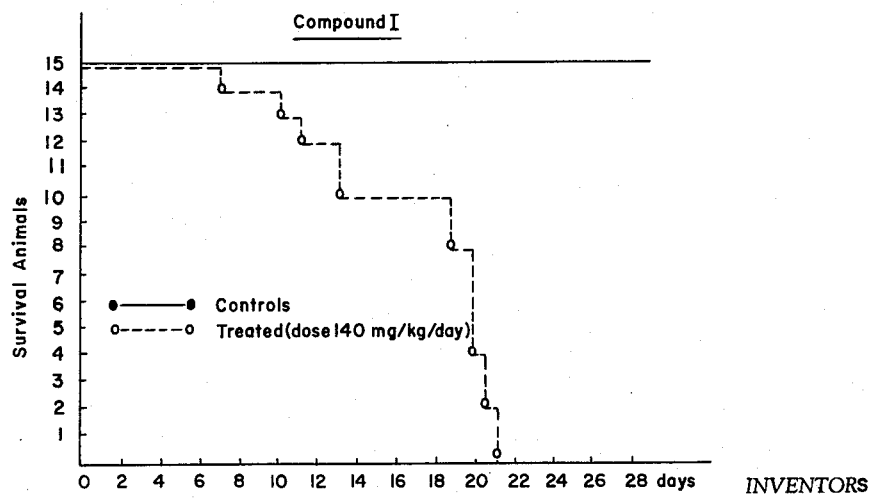
Figure 3:
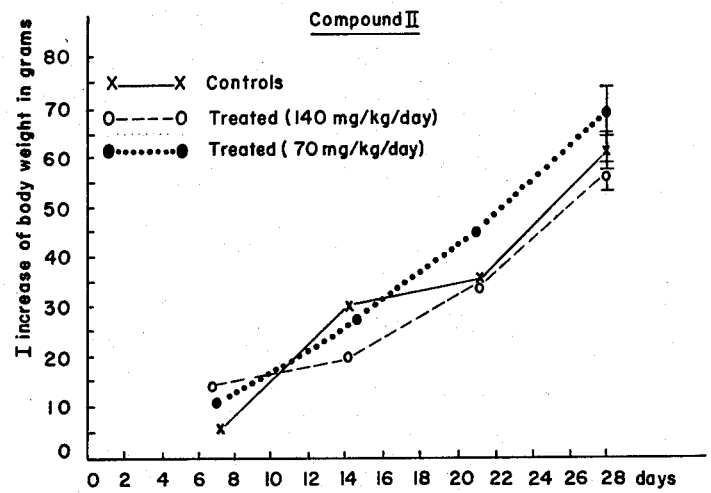
Figure 4:
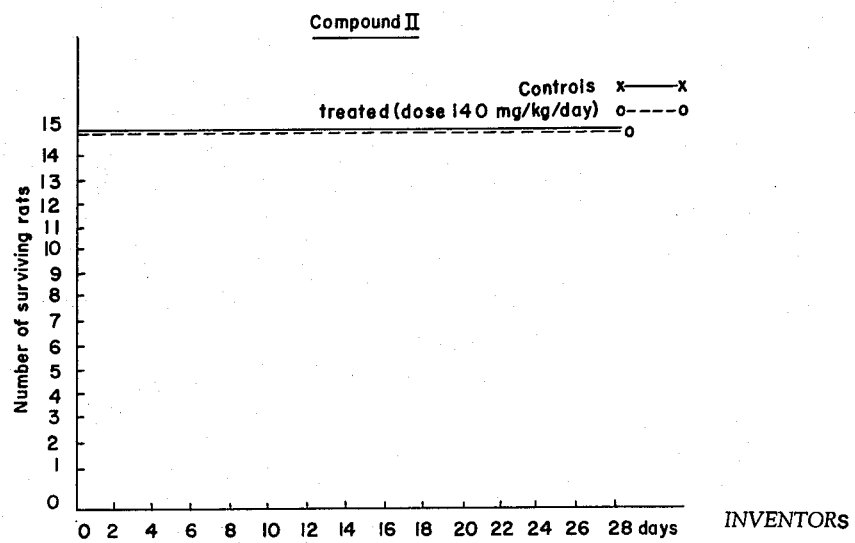

Jan. 21, 1964 P. GIRALDI ET AL 3,118,888
ACYLATED S-TRIAZINES AND PROCESS FOR THEIR PREPARATION
Filed Dec. 17, 1962 2 Sheets-Sheet 2

INVENTORS
PIERNICOLA GIRALDI
DOMENICO ARTINI
GIULIANO NANNINI
WILLY LOGEMANN

BY Cushman, Darby & Cushman
ATTORNEYS

United States Patent Office 3,118,888
Patented Jan. 21, 1964

3,118,888
ACYLATED s-TRIAZINES AND PROCESS FOR THEIR PREPARATION
Piernicola Giraldi, Domenico Artini, Giuliano Nannini, and Willy Logemann, Milan, Italy, assignors to Carlo Erba S.p.A., Milan, Italy, a corporation of Italy
Filed Dec. 17, 1962, Ser. No. 245,226
Claims priority, application Italy Dec. 22, 1961
4 Claims. (Cl. 260—249.9)

We have found that some types of triazines (Italian patent appln. No. 5,179/60) show an antiviral activity in the B type Lee and Craw influenza strains on mice.

We have now ascertained that products of the following formula

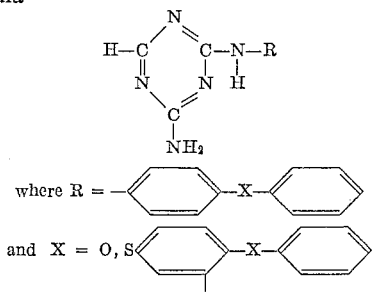

and the benzenic rings can be substituted or not, are particularly active but show a certain chronic toxicity.

We have now found that the bis-acylated products have a minor toxicity after oral administration while the antiviral activity remains unchanged.

However we have seen that the acylation is not a general medium for disintoxication of this type of triazines with antiviral activity.

E.g.: In compounds of the following formula

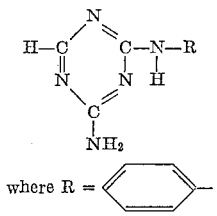

which are more toxic than compounds containing diphenyl-ether or diphenyl-thioether, the bis-acetylation is not sufficient for reducing the toxicity to levels supportable for the clinical use.

These products are synthesized by acylation of the product illustrated in the general formula; e.g. treatment of acetic anhydride with solvents results in a mono-acetyl-derivative; a diacetyl product is obtained resorting the acetic anhydride only; if different anhydrides are used, mixed acylated products are obtained.

The first acylic residue links on the hydrogen of the amino-group in position 4.

The second acylic residue links on the nitrogen in position 2. The following FIGURES (1, 2, 3 and 4) show the toxicity differences existing between the two Products (I, II) of the following formulae:

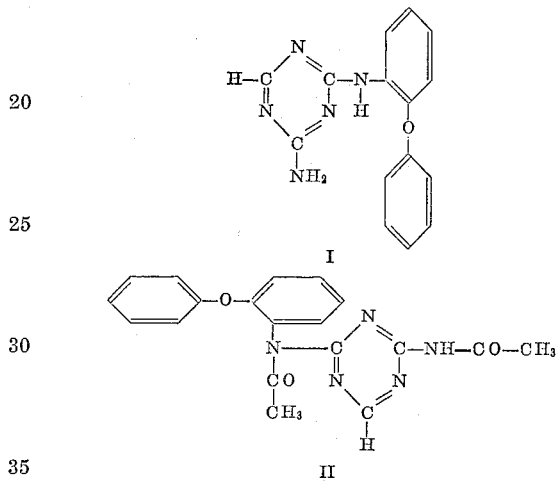

The Tables 1 and 2 show the antiviral activity in the B type Lee and Craw influenza strains of the Product (II) at different infecting doses. The antiviral activity was established by the mortality differences between two groups of mice treated or not treated (each group was composed of 15 animals) and by the differences of lungs' weight between the same groups of animals.

The mice were infected with decreasing doses of the two strains of virus (EID=egg infecting dose).

The administration of the product in animals was started 24 hours before injection.

TABLE 1

Activity of Compound II in Mice Infected With Type B Craw Influenza Strains (2 Mg. Per Day by Oral Route in 2 Doses)

| | Type B strain Craw $10^5$ EID mortality rate | | Type B strain Craw $10^4$ EID mortality rate | | Type B strain Craw $10^3$ EID mortality rate | | Type B strain Craw $10^2$ EID mortality rate | |
|---|---|---|---|---|---|---|---|---|
| | Treated | Controls | Treated | Controls | Treated | Controls | Treated | Controls |
| Time in days: | | | | | | | | |
| 1 [a] | | | | | | | | |
| 2 [b] | | | | | | | | |
| 3 | | | | | | | | |
| 4 | | | | | | | | |
| 5 | | 1 | | | | | | |
| 6 | | 3 | | | | | | |
| 7 | | 7 | | 1 | | | | |
| 8 | 2 | 11 | | 1 | 2 | | | |
| 9 | 5 | 13 | | 3 | 4 | 2 | 0 | 2 |
| 10 | 10 | 15 | | 5 | 5 | 5 | 0 | 2 |
| 11 | 13 | | 2 | 10 | 5 | 6 | 2 | 2 |
| 12 | 15 | | 2 | 12 | 6 | 7 | 2 | 2 |
| 13 | | | 7 | 13 | 6 | 7 | 5 | 2 |
| 14 | | | 9 | 13 | 6 | 7 | 10 | 3 |
| Average lungs' weight: | | | | | | | | |
| Treated animals, g | 0.257 | | 0.217 | | 0.189 | | 0.170 | |
| Control animals, g | 0.317 | | 0.288 | | 0.253 | | 0.203 | |

[a] Start of treatment. [b] Infection of animals.

TABLE 2

*Activity of Compound II in Mice Infected With Type B Lee Influenza Strains (2 Mg. Per Day by Oral Route in 2 Doses)*

|  | Type B strain Lee $10^5$ EID mortality rate | | Type B strain Lee $10^4$ EID mortality rate | | Type B strain Lee $10^3$ EID mortality rate | | Type B strain Lee $10^2$ EID mortality rate | |
|---|---|---|---|---|---|---|---|---|
|  | Treated | Controls | Treated | Controls | Treated | Controls | Treated | Controls |
| Time in days: | | | | | | | | |
| 1 [a] | | | | | | | | |
| 2 [b] | | | | | | | | |
| 3 | | | | | | | | |
| 4 | | | | | | | | |
| 5 | | 1 | | | | | | |
| 6 | | 7 | | 1 | | | | |
| 7 | 7 | 12 | 4 | 7 | | 1 | | |
| 8 | 11 | 15 | 6 | 11 | | 1 | | |
| 9 | 14 | | 6 | 15 | | 1 | | |
| 10 | 15 | | 12 | | 1 | 1 | | |
| 11 | | | 15 | | 1 | 2 | | |
| 12 | | | | | 1 | 3 | | |
| 13 | | | | | 6 | 6 | | |
| 14 | | | | | 7 | 8 | | |
| Average lungs' weight: | | | | | | | | |
| Treated animals, g | 0.248 | | 0.196 | | 0.225 | | | |
| Control animals, g | 0.317 | | 0.333 | | 0.310 | | | |

[a] Start of treatment.
[b] Infection of animals.

This invention is illustrated but not limited by the following examples.

EXAMPLE 1

61 g. o-phenoxy-phenyl-biguanide hydrochloride and 14 g. H.COO.Na are refluxed for 5 h. in 250 ml. H.COOH, then cooled and alkalized with 20% NaOH. Crystallization from 95% alcohol results in 2-(N-o-phenoxy-phenyl)amino-4-amino-1,3,5-triazine (M.P. 175–176° C.).

15 g. 2-(N-o-phenoxy-phenyl)amino-4-amino-1,3,5-triazine and 11.1 ml. acetic anhydride are refluxed for 6 hours in 150 ml. benzene, then evaporated to dryness in vacuum. The residue is washed with ether. Crystallization from isopropyl-alcohol results in 2-(N-o-phenoxy-phenyl)amino-4-(N-acetyl)-amino-1,3,5 - triazine (M.P. 173–175° C.).

16.8 g. 2-(N-o-phenoxy-phenyl)-amino-4-amino-1,3,5-triazine are refluxed for 6 hours in 30 ml. acetic anhydride, then cooled to +10° C.; the solution is treated with water, then filtered. The precipitate is washed with ether and crystallized from isopropyl-alcohol to obtain 2-(N-o-phenoxy-phenyl-N-acetyl)amino - 4 - (N-acetyl)-amino-1,3,5-triazine (M.P. 165–167° C.).

EXAMPLE 2

11.3 g. p-diphenylsulphide-biguanide hydrochloride and 2.2 g. H.COO.Na are refluxed for 5 hours in 75 ml. H.COOH, then cooled, alkalized with 20% NaOH. Crystallization from diluted alcohol results in 2-(N-p-diphenylsulphide)amino-4-amino-1,3,5-triazine (M.P. 203–204° C.).

5 g. 2-(N-p-diphenylsulphide) - amino - 4 - (N - acetyl) amino-1,3,5-triazine are refluxed for 10 hours in 20 ml. acetic anhydride, then cooled, poured in water. Crystallization from diluted dioxane results in 2-(N-p-diphenylsulphide-N-acetyl)-amino-4-(N-acetyl)amino - 1,3,5 - triazine (M.P. 172° C.).

EXAMPLE 3

10 g. o-[(p-carboxymethyl-phenoxy)-phenyl]-amine dissolved in 50 ml. ethyl-alcohol are refluxed with 6.8 g. amino-dichloro-s-triazine and 2 g. sodium carbonate for 5 hours, then cooled and filtered. Crystallization of the precipitate from methanol results in 2{N-o-[(p-carboxymethyl-phenoxy)-phenyl]}-amino-4-amino-6-chloro - 1,3,5-triazine (I) (M.P. 185° C.).

45 g. (I) dissolved in 250 ml. anhydrous dioxane are added with 10 g. triethyl-amine, 6 g. acetic acid, 5 g. palladium on charcoal and reduced to 50°, resulting in 2-{N-o-[(p-carboxy-methyl-phenoxy)-phenyl]}-amino-4-amino-1,3,5-triazine (II) (M.P. 135° C.).

10 g. (II) are dissolved in 30 ml. acetic anhydride added with 4 g. melted sodium acetate and refluxed for 6 hours, then poured on ice. Crystallization from 95% ethanol results in a product corresponding to diacetate (M.P. 178–180° C.).

EXAMPLE 4

8.1 g. 2-(N-o-phenoxy-phenyl)amino-4-amino-1,3,5-triazine and 26.3 g. benzoic anhydride are refluxed for 10 hours in 160 ml. benzene, then evaporated to dryness in vacuum. Crystallization of the residue from acetone results in 2-(N-o-phenoxy-phenyl)-amino-4-(N-benzoyl)amino-1,3,5-triazine (M.P. 180° C.).

4 g. 2-(N-o-phenoxy-phenyl)amino - 4 - (N - benzoyl) amino-1,3,5-triazine and 5.7 ml. acetic anhydride are refluxed for 10 hours in 80 ml. benzene, then evaporated to dryness in vacuum. Crystallization of the residue from ethyl-alcohol results in 2-(N-o-phenoxy-phenyl-N-acetyl)amino-4-(N-benzoyl)amino-1,3,5-triazine (M.P. 175–176° C.).

EXAMPLE 5

58 g. of p-phenoxy-phenyl-biguanide.HCl and 12.9 g. of HCOONa are refluxed for 5 hours in 240 ml. of HCOOH. The mixture is cooled, alkalized with 20% NaOH, and crystallized from dioxane to obtain 2-(N-p-phenoxy-phenyl)amino-4-amino-1,3,5-triazine (M.P. 233–235° C.).

30 g. of 2-(N-p-phenoxy-phenyl)amino-4-amino-1,3,5-triazine and 22 ml. of acetic anhydride are refluxed for 12 hours in 150 ml. of glacial acetic acid. The solution is cooled, poured into water, and the precipitate is crystallized from diluted dioxane to obtain 2-(N-p-phenoxy-phenyl)amino-4-(N-acetyl)-amino-1,3,5 - triazine (M.P. 223° C.).

15 g. of 2-(N-p-phenoxy-phenyl)amino-4-(N-acetyl)amino-1,3,5-triazine are refluxed for 6 hours in 45 ml. of acetic anhydride. The solution is cooled at +10°, the precipitate obtained is filtered, washed with ether and crystallized from 99.9% ethanol to obtain 2-(N-p-phenoxy-phenyl-N-acetyl)amino-4-(N-acetyl)amino-1,3,5 - triazine (M.P. 150–151° C.).

We claim:
1. 2-(N-o-phenoxy-phenyl-N-acetyl)amino-4 - (N - acetyl)-amino-1,3,5-triazine.
2. 2-(N-o-diphenylsulphide-N-acetyl)amino-4-(N - acetyl)-amino-1,3,5-triazine.
3. 2-{N-o-[(p-carboxymethylphenoxy)-phenyl]-N -acetyl}-amino-4-(N-acetyl)amino-1,3,5-triazine.

4. 2-(N-p-phenoxy-phenyl-N-acetyl)amino-4 - (N - acetyl)amino-1,3,5-triazine.

References Cited in the file of this patent
FOREIGN PATENTS
784,615    Great Britain _____ Oct. 9, 1957